UNITED STATES PATENT OFFICE.

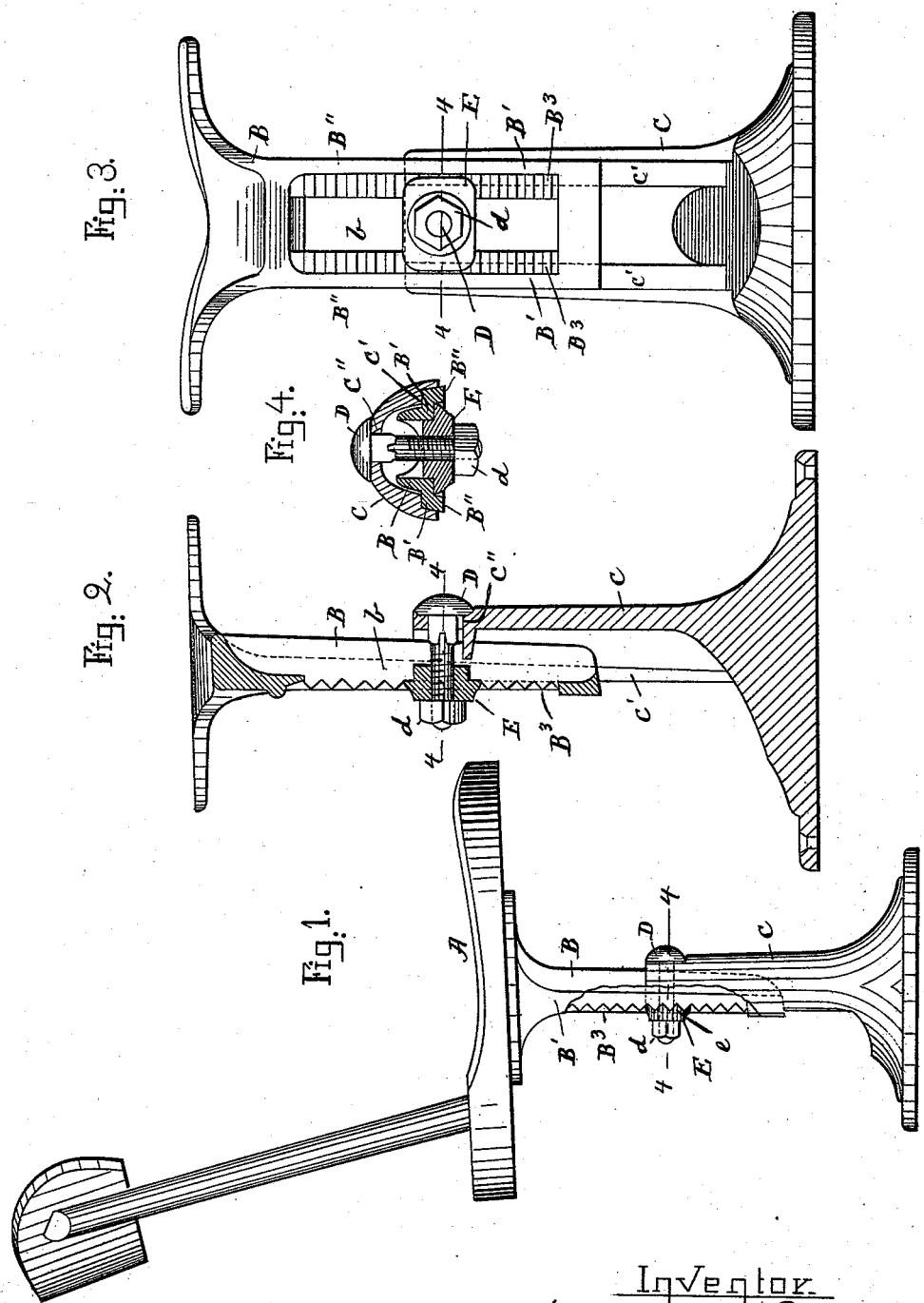

THOMAS R. ROULSTONE, OF SOMERVILLE, MASSACHUSETTS.

ADJUSTABLE SUPPORT FOR SCHOOL FURNITURE.

SPECIFICATION forming part of Letters Patent No. 532,396, dated January 8, 1895.

Application filed March 6, 1894. Serial No. 502,572. (No model.)

*To all whom it may concern:*

Be it known that I, THOMAS R. ROULSTONE, a citizen of the United States, and a resident of Somerville, in the county of Middlesex and State of Massachusetts, have invented new and useful Improvements in Adjustable Supports for School Furniture, of which the following, taken in connection with the accompanying drawings, is a specification.

This invention relates to improvements on the United States Letters Patent granted to me November 14, 1893, No. 508,557, for adjustable supports for school furniture and it consists in means for more firmly securing the seat shank to the base after being adjusted and to this end my invention consists in providing a base for school furniture, with smooth, tapering guide walls and having a perforation at or near its upper end for the reception of a bolt, a slotted shank also having smooth tapering guide-ribs fitting the tapering guides of the base portion, and provided on its rear face with serrations or racks, a clamping bolt detachably fitted in the perforation of the base and extending through the slotted shank, a washer fitted over said bolt and having its inner face toothed or serrated, and adapted to interlock with the teeth or serrations on the slotted shank, and a nut engaging the end of said bolt and bearing against the washer, thereby holding the parts firmly together and affording a secure lock for the supporting shank.

In order to enable others skilled in the art to which my invention pertains, to make, use and construct the device I will proceed to describe the same in detail reference being had to the accompanying drawings, in which—

Figure 1, represents a side elevation of the invention showing a portion of the stationary base as broken away. Fig. 2, represents a vertical longitudinal section of the same. Fig. 3, represents a rear view; and Fig. 4, represents a cross section on the line 4—4 shown in Figs. 1, 2 and 3.

Similar letters refer to similar parts wherever they occur on the different parts of the drawings.

In the drawings the invention is shown as applied to a chair, but may be equally well used for desks, stools or other furniture as may be desired.

A, is the seat to which is secured the downwardly projecting slotted shank B, having the vertical slot $b$.

B', B', are slightly tapering vertical ribs on the shank B, which are guided in correspondingly tapering guide grooves C', C', in the stationary standard or base portion C, as fully shown and described in my above mentioned Letters Patent.

The base C, has at or near its upper end a perforation or notch C'' through which passes loosely the headed screw bolt D, which latter passes through the slot $b$, and a washer E, spanning the rear side of the slotted shank B, outside of which the said screw bolt D, is provided with a fastening nut $d$, in a manner and for the purpose as fully set forth and described in my aforesaid Letters Patent.

The rear side of the shank B, is preferably provided with vertical lips or ledges B'' between which the washer E, fits loosely and is thereby prevented from turning round while adjusting the nut $d$, as shown.

For the purpose of more firmly securing the shank B, in its adjusted position relative to the base C, I provide the rear portion of the slotted shank B, with toothed racks $B^3$ $B^3$ adapted to interlock with a correspondingly toothed surface or rack $e$, on the inside of the washer E, as shown in the drawings.

By clamping the tapering ribs B', B', on the shank B, against the tapering guide grooves C', C', by means of the fastening bolt D, its nuts and washer, after the seat is adjusted, it will be firmly held in its adjusted position and additionally secured and held in such position by the interlocking of the toothed washer E, with the racks $B^3$, $B^3$, on the shank B, as hereinabove set forth.

Having thus fully described the nature, construction, and operation of my invention, I wish to secure by Letters Patent and claim—

An adjustable support for school furniture, consisting of a base portion C having vertically tapering guides C' and a perforation C'' at its upper end for the reception of a bolt, a slotted shank B having tapering guide-ribs B' fitting the tapering guides of the base portion and provided on its rear face with racks $B^3$, $B^3$, the abutting faces of said guides C' and ribs B' being smooth, a clamping bolt D detachably fitted in the perforation C'' and extending through the slotted shank, a washer E fitted over said bolt and toothed on its inner face to interlock with the racks $B^3$, $B^3$, and a nut $d$ engaging the end of said bolt and bearing against the washer, substantially as described.

In testimony whereof I have signed my name to this specification, in the presence of two subscribing witnesses, on this 23d day of February, A. D. 1894.

THOMAS R. ROULSTONE.

Witnesses:
ALBAN ANDRÉN,
KITTIE M. HANSON.